Jan. 24, 1967    F. F. HAEFNER    3,299,980
TRAILER POWER UNIT
Filed Dec. 7, 1964

United States Patent Office 3,299,980
Patented Jan. 24, 1967

3,299,980
TRAILER POWER UNIT
Fred F. Haefner, R.D. 2, Evans City, Pa. 16033
Filed Dec. 7, 1964, Ser. No. 416,548
6 Claims. (Cl. 180—14)

This invention relates to an auxiliary power drive for trailer and tractor combinations.

It is an object of the present invention to provide a trailer power unit which will be mounted upon the axle housing of a trailer which is being pulled by a tractor to enable the tractor and trailer to move when bogged down.

As a tractor only has power at its own wheels, providing power to the trailer wheels when necessary, will help a great deal in situations of the above-mentioned type.

Another object of the present invention is to provide a trailer power unit which will utilize a small electric or air driven motor to deliver enough torque and r.p.m. through a proper gear ratio and a hydraulic transmission to operate efficiently. The transmission will also serve to keep from burning up the motor.

A further object of the present invention is to provide a trailer power unit which will be of such construction as to operate from the voltage available within the tractor, and the device will have its control means contained within the cab of the tractor. Control means for the solenoids of the device will also be immediately available within the cab so as to engage sprockets for the drive unit when needed.

A still further object of the present invention is to provide a trailer power unit which will utilize a splined shaft on the transmission end in order that the device may be easily engaged and disengaged at will.

Other objects of the invention are to provide a trailer power unit bearing the above objects in mind which is of simple construction, has a minimum number of parts, is inexpensive to manufacture and efficient in operation and use.

For other objects and for a better understanding of the invention, reference may be had to the following detailed description taken in conjunction with the accompanying drawing, in which.

Figure 1:
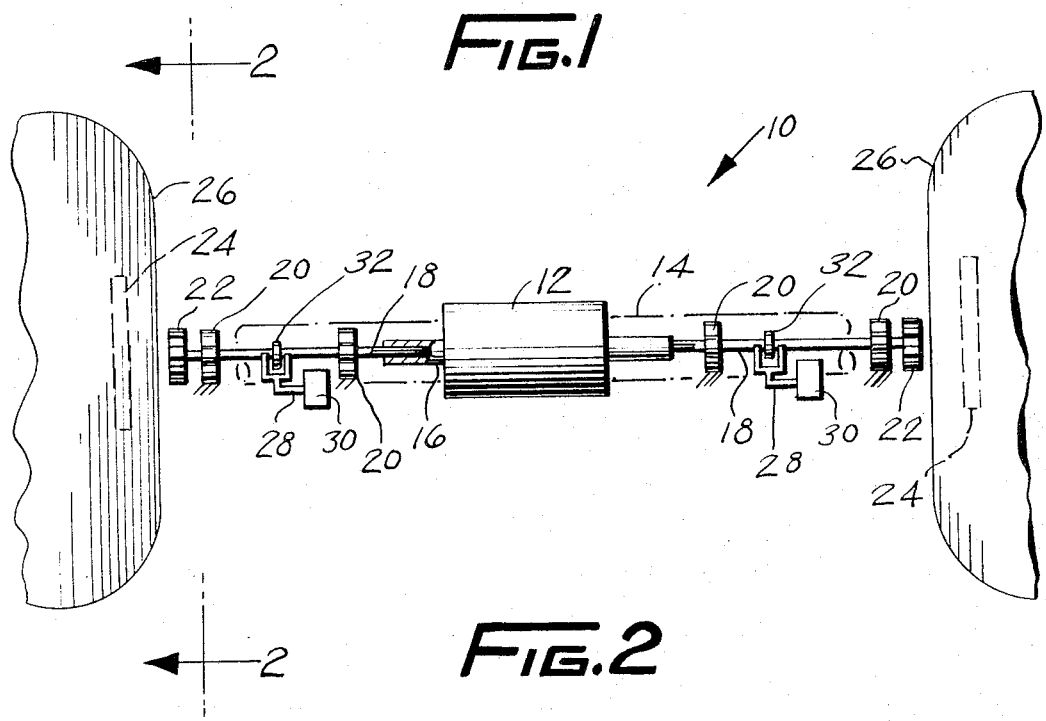
FIGURE 1 is a front view of the present invention showing the wheel gears spaced away from the drive gears for clarity.
Figure 2:
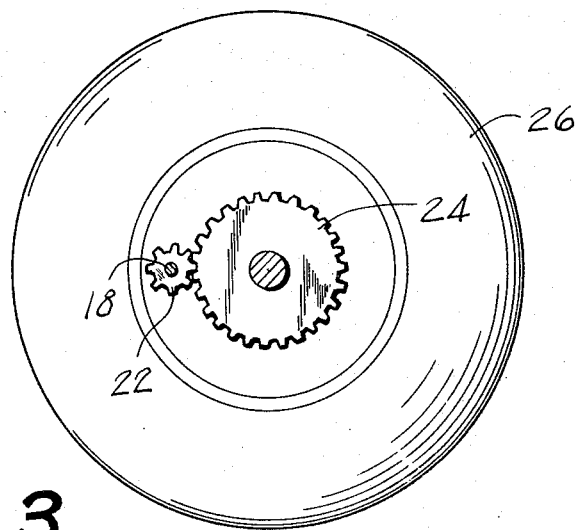
FIGURE 2 is a view taken along the lines 2—2 of FIGURE 1.
Figure 3:
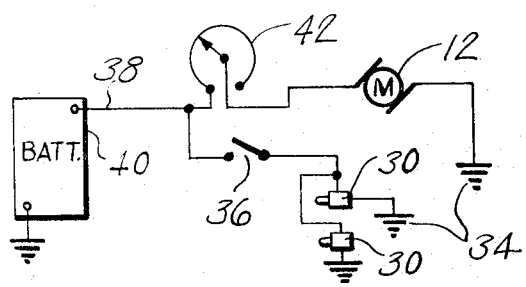
FIGURE 3 is a schematic wiring diagram of the invention.

Referring now more in detail to the drawing, a trailer power unit 10 made in accordance with the present invention is shown to include a combination drive motor and transmission 12 which is secured to the axle housing 14 of a trailer (not shown). Combination drive motor and transmission 12 is provided with an elongated hollow and land and groove shaft 16 which extends from either side of combination motor drive and transmission 12. A splined shaft 18 is freely and slidably received within each end of shaft 16 of combination drive motor and transmission 12 for a purpose which hereinafter will be described. Splined shafts 18 are supported within a plurality of spaced apart bearings 20 which are secured to axle housing 14. A gear 22 is fixedly secured to the end of splined shafts 18 and provides a means for toothingly engaging a drive gear 24 secured to the wheels 26 of the trailer and provides a means for rotating wheels 26 when combination drive motor and transmission 12 is activated. A fork 28 secured to each of the solenoids 30 receives a flange 32 of shafts 18 and provides a means for horizontally moving shafts 18 in and out of the shaft 16 extending from the combination drive motor and transmission 12. Solenoids 30 are secured to axle housing 14 of trailer power unit 10 and one side is electrically secured to ground 34. The other sides of solenoids 30 are wired in series with a switch 36 which is connected to the positive line 38 of battery 40 of the tractor. A rheostat 42 is electrically secured within positive line 38 and is connected with combination drive motor and transmission 12 on one side. The other side of combination drive motor and transmission 12 is secured to ground 34 and rheostat 42 provides a means of reversing the rotation of combination drive and transmission 12 in the well known manner by switching the brush polarity or the field terminals of drive motor and transmission 12.

In operation, speed and direction of rotation of the wheels 26 of the trailer are controlled from the cab of the tractor by means of rheostat 42 which may increase or decrease the speed of wheels 26 after switch 36 is closed, to energize solenoids 30. When solenoids 30 are energized, fork 28 receiving flanges 32 of shafts 18 urges shafts 18 outward, which will toothingly engage gears 22 with gears 24 of wheels 26. When traction of wheels 26 is not desired, switch 36 is opened and solenoids 30 urge shafts 18 in their respective gears 22 away from the gears 24 of wheels 26. Wheels 26 are then allowed to rotate freely without power from the auxiliary unit herein described.

It shall be recognized that the gear 24 secured to the brake drums of the trailer is provided with teeth that protrude to the inside in order to be opened so that the teeth of the drive gears 22 will push the mud or other debris through it as it rotates.

It shall further be noted that in the event air is used and the supply is used from the tractor, this same principal of control is used as heretofore described.

While various changes may be made in the detail construction, it shall be understood that such changes shall be within the spirit and scope of the present invention as defined by the appended claims.

What I claim as new and desired to protect by Letters Patent of the United States is:

1. A trailer power unit comprising, in combination, a drive motor and transmission providing power means for rotating the wheels of a trailer in a tractor-trailer combination, a hollow and internally land and grooved shaft carried by said combination drive motor and transmission providing a means for slidably receiving a splined end shaft on either end of said combination drive motor and transmission, a plurality of bearings providing support means for said splined shafts, a pair of spaced apart drive gears carried by said splined shafts, a pair of driven gears secured to the brake drums of the wheels of the trailer, a pair of solenoids and switch means providing a means for extending said splined shafts to engage said drive gears with said driven gears to rotate the wheels of said trailer, a rheostat and polarity reversing means for said combination drive motor transmission providing means for increasing or decreasing the speed and also providing means for reversing the brush or field polarity of the combination drive motor and transmission of said trailer power unit.

2. The combination according to claim 1 wherein said combination drive motor and transmission is secured to the axle housing of said trailer and said hollow land and grooved shaft of said combination drive motor and transmission extends from either side of the ends of said drive motor and transmission, and said shafts freely and slidably receive the splined ends of drive shafts received within spaced apart bearings upon said axle housing of said trailer.

3. The combination according to claim 2 wherein each drive gear on the end of said splined shafts is secured to the ends of said splined shafts and toothingly engages a driven gear secured to the brake drum of the wheels of said trailer when said solenoids are actuated by said switch in the cab of the trailer-tractor.

4. The combination according to claim 3 wherein said switch, when opened, disengages said drive gears with said driven gears of said wheels of said trailer by slidably returning said splined shaft into the extending land and grooved shaft of said drive motor and transmission of said device.

5. The combination according to claim 4 wherein rotary motion is delivered to said wheels of said trailer by fork means secured to said solenoids, and said fork receives a flange secured to said splined shafts and allows said solenoids to urge said shafts inwardly and outwardly of the extending shaft of said drive motor and transmission.

6. The combination according to claim 5 wherein speed control means for said trailer power unit is provided for by a rheostat mounted in the tractor pulling said trailer and said rheostat increases or decreases the current to said drive motor and transmission unit of said trailer power unit.

References Cited by the Examiner

UNITED STATES PATENTS

| | | | |
|---|---|---|---|
| 1,375,000 | 4/1921 | Glenn | 180—14 X |
| 2,769,384 | 11/1956 | Selyer | 180—14 X |
| 3,140,617 | 7/1964 | Palmer | 74—6 |

FOREIGN PATENTS 607,588   8/1960   Italy.

BENJAMIN HERSH, *Primary Examiner.*

C. C. PARSONS, *Assistant Examiner.*